April 17, 1951
L. J. RASAKA ET AL
2,549,008
CORER WITH DEPTH GAUGE
Filed Nov. 25, 1947
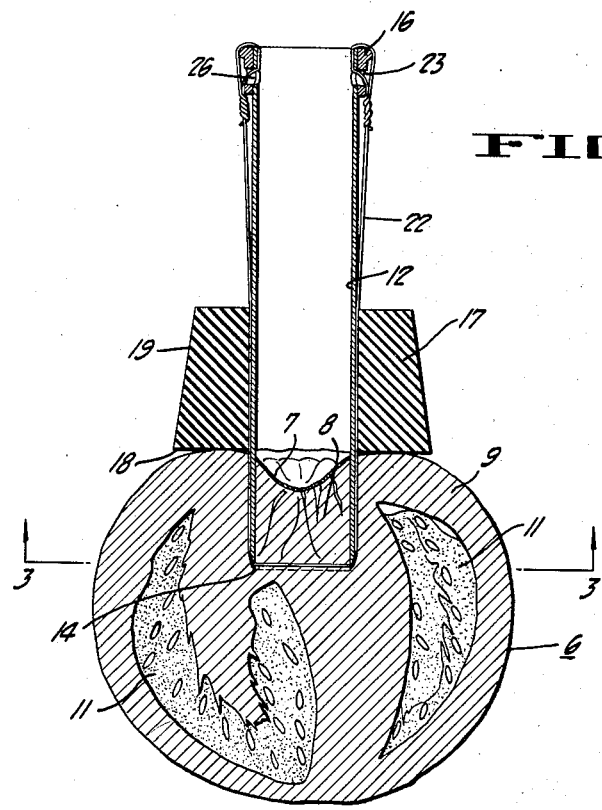
FIG_2_
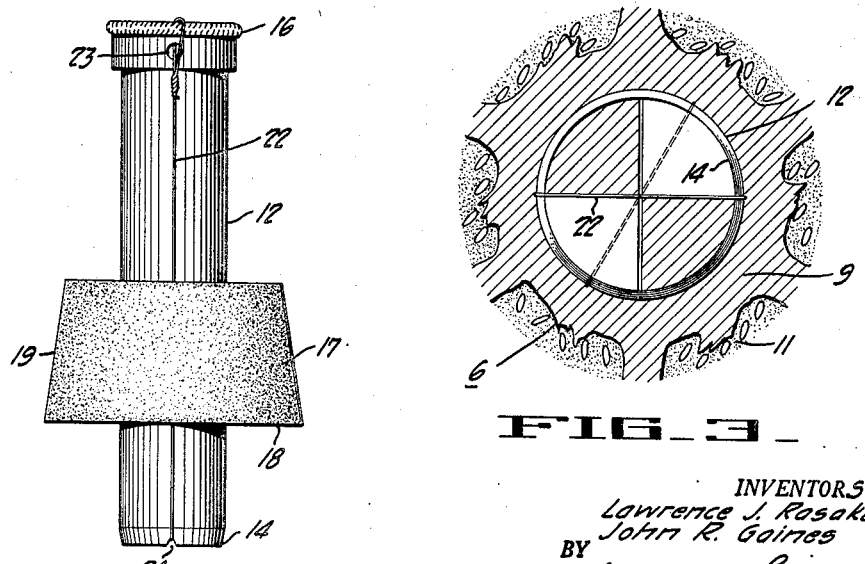
FIG_3_
FIG_1_
INVENTORS
Lawrence J. Rasaka
John R. Gaines
BY
Masena Lothrop Patented Apr. 17, 1951

2,549,008

UNITED STATES PATENT OFFICE 2,549,008

CORER WITH DEPTH GAUGE

Lawrence J. Rasaka and John R. Gaines, Sacramento, Calif.; said Gaines assignor to said Rasaka Application November 25, 1947, Serial No. 788,008

1 Claim. (Cl. 30—302)

Our invention relates to means for assisting in preparing material such as certain vegetables and fruits for processing or canning and for use in the home where said fruits and vegetables are used in the fresh state, and is especially concerned with a means for removing a center portion or core from a fruit such as tomatoes for processing in such a way that even though a core is removed, the remainder of the structure of the fruit is retained intact during processing.

In canning and processing of fruits and vegetables certain preliminary steps of preparation prior to cooking and canning are desirable. Many of these steps involve hand labor, the reduction of which to reduce the cost of the pack are advantageous. Because of such preliminary treatment, many fruits and vegetables lose their contour and their shape or characteristics during subsequent processing and canning and hence do not present as marketable or as attractive an appearance as before.

It is therefore an object of our invention to provide an improved means for preparing fruit and vegetables for processing.

Another object of the invention is to provide means for removing a portion such as a core from a fruit or vegetable such as a tomato.

Another object of the invention is to provide a fruit or vegetable corer of such a nature that although a core is readily removed the remainder of the fruit or vegetable is not seriously altered.

Another object of the invention is to provide a corer which can quite easily be substituted for coring devices now in use without requiring major changes in the remainder of the canning process or packing house routine.

Other objects together with the foregoing are attained in the embodiment of the invention described in the following description and illustrated in the accompanying drawing in which Figure 1 is a side elevation of a corer constructed in accordance with our invention.

Figure 2 is a cross section on an axial plane through our corer embedded in a tomato in the process of being cored.

Figure 3 is a cross section, portions being broken away to reduce the size of the figure, and the plane of section being represented by the line 3—3 of Figure 2.

While the corer of our invention can be embodied in numerous different forms and can be utilized in several different processes and is furthermore well adapted for use in connection with various fruits and vegetables, it has been singularly successful in connection with the coring of tomatoes and therefore is so described herein as an example.

The ordinary tomato 6 suitable for use in large scale canning is often packed as puree or paste and if so its previous form or contour is of no consequence. But in the event a higher price is to be obtained and a select market reached it is desirable to retain the original contour of the tomato. Its shape will be retained during processing, such as cooking and canning, if substantially all of the fibrous structure is left intact. Yet, near the stem end 7 of the tomato there is a hard area of some depth which is undesirable and which it is necessary to remove. Surrounding this hard zone 8 is a fleshy portion 9 of the tomato acting in part to segregate several cavities 11 containing seeds, fluid and semi-fluid portions.

Just prior to canning the tomato is cored by an operator holding a knife in one hand and the tomato in the other. The knife is inserted into and rotated within the zone 8 removing a somewhat conical core therefrom. This hand operation is tedious and expensive. It is especially deleterious in that the operator is prone to extend the knife blade or point beyond the zone 8 into one or more of the compartments 11, thus severing the fibrous compartment wall and permitting the escape of some or all of the fluid contents. Then or in later processing the compartment collapses. Since the original contour of the fruit is thereby destroyed, it must be graded lower and is no longer salable as a whole article.

In order to avoid these difficulties, we provide, in accordance with our invention, a corer comprising a central tube 12 preferably of metal or plastic having a circular cylindrical form and of a convenient length to be held in the hand of a user. The tube is substantially uniform in cross section throughout its length and has a uniform wall thickness. It extends from a lower, beveled, or thinned cutting edge 14 to an upper reinforced, flanged edge 16. The tube being somewhat sharp readily penetrates the flesh of the tomato but it is not necessary to have the cutting edge as sharp as a knife. The tubular cutter is safer for the operator to use than the customary knife.

In operation is is desired to force the tube into the flesh of the tomato to a predetermined depth only, in order that the cutting edge will not extend so far as to sever the walls of the seed compartments. For that reason, we provide a combination depth gauge or stop and hand grip. This is conveniently a thick collar 17 of rubber or comparable material. It is centrally bored to slip readily over the tube and has a flattened face 18 to abut the fruit to limit the depth of penetration of the cutting edge. Furthermore, the collar is frustoconical, having a conical surface 19 more readily to fit the user's hand. Because of the frictional engagement between the collar and the tube the collar can be positioned at any selected location axially of the tube to provide an effective at any selected depth.

The tube is not effective to sever the flesh of the core from the remainder of the fruit, nor to dislodge the core.

For that reason we provide a means for severing the bottom or interior surface of the core from the remainder of the fruit. This is constituted by a fine cutting wire 22 one end of which passes through an aperture 23 in the tube flange 16 and is twisted upon itself to form a fastening. The wire then extends through a notch 24 interrupting the cutting edge 14 and thence across the tube substantially on a diameter thereof, through a comparable notch in the opposite portion of the cutting edge. Finally, the wire extends along the tube and through another aperture 26 in the upper flange 16 and its end is twisted and fastened. The tension is augmented by the closely fitting collar 17 which encompasses the wire as well as the tube. The wire is small and makes a tiny diametral cut in the flesh of the fruit as the tube is pressed into it. After the tube has reached the set depth as established by the collar 17, the operator produces relative rotation of the tube and the fruit. This is done by holding the tube and rotating the fruit, or by holding the fruit and rotating the tube or by a combination of such motions. As the diametral portion of the wire 22 is rotated, it passes through about or a little more than 180 degrees and so severs the lower surface of the core from the remainder of the fruit.

Following this, the corer is removed or withdrawn from the fruit. The effect of the diametral portion of the wire is to act as a holder for the severed core and to assist in carrying it physically from the remainder of the fruit as the corer and the fruit are separated. The severed core is retained in the corer partly by the friction between the severed core and the walls of the tube and partly by the confining action of the diametral portion of the wire. As the corer is used on successive fruits the severed cores are progressed through the center of the tube by the succeeding cores and eventually are discharged from the upper open end thereof.

With a structure as shown herein, the operator's output of cored fruit such as tomatoes is increased markedly without liklihood of injury to himself. The undesired portion is more satisfactorily removed with a cylindrical core than with the customary conical core. The depth of cut is so regulated and is so shaped that the seed cavities are not pierced. The cored fruit remains physically whole and firm, thus after the usual handling and processing in canning it retains its whole shape and can be sold as whole fruit at a premium price.

It is usual in large operations to provide several different sizes of corers for use with graded or segregated fruit so that precisely the right volume of core will be removed from a fruit of a certain size or size range. Additionally, the materials of the corer are such that they are not affected by the fruit or vegetable acids with which they come into repeated contact. If there is any such effect it is normally in the direction of sharpening the cutting edge by chemical action and of sharpening or reducing in diameter the cutting wire. In the event the wire should fail mechanically, it readily can be restrung so that the corer can be utilized for a long time.

The direction of motion of the corer is generally along the axis of the tomato from the stem end toward the flower end. This direction of cut is superior to the previous side or circular direction of a blade knife cut because of the layered construction of the tomato. A better shearing action of the pulp results with a more nearly exact severance of the undesired core portion.

We claim:

A corer comprising a stiff tube of a size to be held in the hand of a user, said tube being sharp on one end and having diametrically disposed notches on said end and being blunt on the other end, a wire extending across said sharp end of the tube being disposed in said notches and extending along the outside of said tube toward said blunt end thereof, means adjacent said blunt end for holding said wire taut, and a collar of deformable material surrounding and frictionally engaging said tube and the wire extending along the outside thereof.

LAWRENCE J. RASAKA.
JOHN R. GAINES.

REFERENCES CITED

The following references are of record in the file of this patent:

UNITED STATES PATENTS

| Number | Name | Date |
|---|---|---|
| 316,759 | Dexter | Apr. 28, 1885 |
| 358,792 | Simpson | Mar. 1, 1887 |
| 737,452 | Needles | Aug. 25, 1903 |
| 1,293,351 | Creasey | Feb. 1, 1919 |
| 1,568,008 | Thomas | Dec. 29, 1925 |